Figures 1, 2:
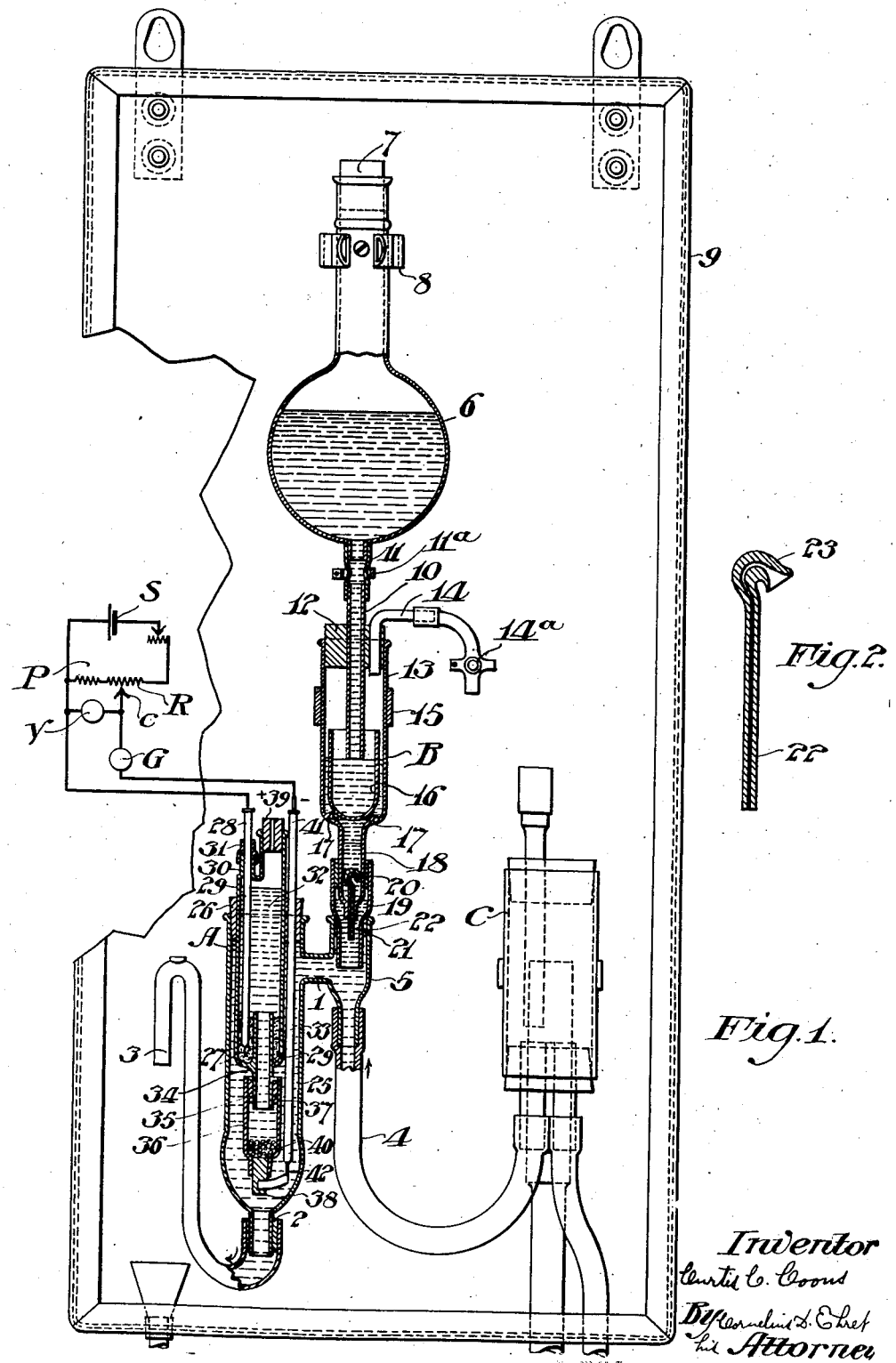

March 20, 1934. C. C. COONS 1,951,395
APPARATUS FOR MEASURING ION CONCENTRATION Filed Nov. 29, 1930

Inventor
Curtis C. Coons

Patented Mar. 20, 1934

1,951,395

UNITED STATES PATENT OFFICE 1,951,395

APPARATUS FOR MEASURING ION CONCENTRATION

Curtis C. Coons, Philadelphia, Pa., assignor to Leeds & Northrup Company, Philadelphia, Pa., a corporation of Pennsylvania Application November 29, 1930, Serial No. 499,121

1 Claim. (Cl. 204—5)

My invention relates to the determination of measurement of the concentration of a selected ion, as of hydrogen, hydroxyl, etc., in a flowing solution of electrolyte.

In accordance with my invention, a solution of an oxidizing-reducing agent, as quinhydrone, is introduced into the stream, in proper proportion, for causing the production of an electro-motive force from which the ion-concentration of the stream may be continuously and immediately determined.

Further in accordance with my invention, the quinhydrone solution, or equivalent, is fed to the stream by a constant-head device to maintain a constant rate of flow, which rate may be nicely adjusted in accordance with the requirements or conditions of operation; more particularly, the solution is introduced into the stream counter to its flow to insure or assist rapid admixture or co-mingling.

Further in accordance with my invention, the resultant solution, that is the stream after addition of the quinhydrone solution, flows through a cell containing electrodes connected to apparatus for measuring, recording, or controlling the selected ion concentration of the stream.

My invention also resides in the method and structure of the character hereinafter described and claimed.

For an understanding of my invention and for illustration of one of the forms it may take, reference is to be had to the accompanying drawing in which:

Fig. 1 is a front elevational view with parts in section, of apparatus constructed in accordance with my invention.

Fig. 2, in section, and on enlarged scale, is a detail view of an element of the apparatus of Fig. 1.

Referring to Fig. 1, there is illustrated a cell A for the production of an electro-motive force varying with variations in the concentration of a selected solution of electrolyte, which, or a predetermined fraction of which, is, in the example shown, continuously passed through the cell structure entering the inlet 1 flowing downwardly through the cell adjacent the electrodes and finally passing through the discharge outlet 2 to the tube 3.

The solution flowing to the cell passes through the tube 4 which connects to the lower end of a chamber 5 in communication with the inlet 1 of the cell. A constant head device B for supplying to the stream, a solution of an oxidizing-reducing agent, as quinhydrone, chloranil, quinoquinhydrone, hydro-quinhydrone, etc., is in communication with the upper side of the chamber 5, so that the solution enters the stream countercurrent thereto, ensuring rapid and complete co-mingling.

The solvent for the oxidizing-reducing agent should be miscible with the solution comprising the flowing stream in practically all proportions and should dissolve sufficient oxidizing-reducing agent to effect the desired oxidization-reduction equilibrium. For example, in measuring the selected ion concentration of treated drinking water, the solution may be 90% ethyl-alcohol, 10% acetone, and containing 30 grams of quinhydrone per liter. For satisfactory and economical operation in this specific example, the solution may be added at the rate of 300 cc. per twenty-four hours to a stream flowing at a rate of 80 to 100 cc. per minute.

As shown, the constant head device B for feeding the solution at a constant and controllable rate, consists of a reservoir or flask 6 provided with a removable stopper 7 for normally closing it to atmosphere and held in adjustable position by the clamp 8 suitably secured to the base or mounting member 9. The pipe 10 projecting from the bottom of the flask 6 and in communication therewith through the tube 11, passes through a stopper 12 at the upper end of the constant head chamber 13 in communication with atmosphere through the pipe 14 which also passes through the stopper 12. The tube 13 is held in fixed position by the clamp 15. Preferably, there is disposed within the chamber 13 a porous thimble 16, of alundum, or the like, for filtering any solids or precipitates, the circumferentially spaced projections 17 holding the thimble out of contact with the sides of the tube and permitting free flow of the liquid to the lower neck portion 18 which is raised by the upper end of a tube 19, the stopper 20 receiving the neck portion 18 and closing the top of tube 19 whose lower open end lies within the chamber 5 closed by the stopper 21 through which the tube 19 passes. The quinhydrone solution in passing from the constant head device B to the stream, flows through the capillary tube 22, extending to suitable extent beyond the lower end of the neck portion 18 in chamber 13 and sealed therein by suitable cement. The primary purpose of the tube 19 is to protect the capillary tube.

To avoid clogging of the fine bore of the capillary tube, which may be of the order of ten thousandths of an inch, the upper end of the tube is provided with a hood or flared portion 23 which serves as a baffle to prevent fine solids or precipitates from entering the upper end of the tube bore. The hood closely fits the inside diameter of the neck 18, but in any event, as the rate of flow of the solution is very low, there is little or no tendency for the precipitate to enter beneath the hood 23.

The volume of solution within the flask 6 does not influence the flow of quinhydrone through the capillary tube as the solution is held in the flask by atmospheric pressure. When the level of the solution within the chamber 13 falls below the bottom of tube 10, air through the tube 14 passes through tube 10 to flask 6, and the solution flows from the flask again raising the level of the solution. Feeding of the solution may be stopped by closing valve 14a to the atmosphere.

The rate of flow of the quinhydrone solution is controlled by the capillary tube 22 which is fixed for a given piece of apparatus, and by the head of solution within the chamber 13 between the capillary tube and the bottom of or opening in tube 10. By loosening the clamp 8 and moving the flask 6 up or down, this head, and therefore the rate of flow from the constant head device B may be adjusted. For a given solution under measurement flowing to the cell A at constant rate, this head is adjusted experimentally or in accordance with previous experience or calibration and then remains fixed until the operating conditions are changed. Constant desired rate of flow of the electrolyte is maintained by the apparatus C forming per se no part of the present invention.

The concentration cell A is generally similar to that disclosed in Parker Patent 1,599,483. The constant half cell or positive electrode structure comprises a vessel 24, of glass or other suitable material, supported in the end of the vessel 25, by a stopper 26, or equivalent. Electrical communication with the interior of vessel 24 is effected through the conductor 27 exposed at opposite ends of the rod 28, of glass, or the like. The rod 28 is preferably removable, and as shown, is detachably held to the projecting tube portion 30 of the vessel 24 by the nipple 31.

For developing a constant electro-motive force within the vessel 24, contact is effected between a suitable metal and a reference solution maintained at a definite composition and concentration. To this end, there is disposed within vessel 24 a pool of mercury 29, in electrical contact with the exposed conductor at the lower end of rod 28, with which pool there contacts a solution of potassium chloride 32, preferably saturated and containing calomel, i. e. mono chloride of mercury, a supply of which in powder form may be disposed above the pool of mercury as indicated at 33.

Extending upwardly within the vessel 24 is the re-entrant tube-like member 34, of any suitable length, for effecting communication with that part of the vessel containing the reference solution. Tube 24 is also extended downwardly as a spout like member 35, which enters the top of the intermediate vessel 36 through the stopper or sealing ring 37. The lower end of the intermediate vessel 36 is closed by a plug or stopper 38 of glass, preferably ground, for restricting the conductive path between the solution in vessel 24 and the solution in the vessel 25, which is that of the stream flowing through the cell. Preferably and as indicated, the vessel 24 is not sealed to atmosphere, the stopper 39 being provided with an opening affording access of air. As a result there is not only diffusion but also leakage of potassium chloride solution from the intermediate chamber 36 into the vessel 25. Although there is gradual diffusion and leakage, the crystals 40, of potassium chloride, maintain the solution in chamber 36 in a desired saturated condition. The negative electrode consists preferably of a substantially semi-circular band of noble metal, as platinum, gold, or iridium, disposed adjacent the lower end of the intermediate chamber 36 at the end of rod 41 which encloses and seals conductor 42. The rod 41 passes through and is held in position at the upper end of the vessel 24.

The down flow of the electrolyte through the cell insures that fresh liquid continuously passes toward and beyond the electrode 42 so that the potential developed across the cell terminals is representative of the true selected ion concentration of the stream.

The apparatus described is capable of continuously and accurately measuring the selected ion-concentration for long periods of time, as months, without attention except addition of solution to flask 6 to replace that fed to the stream and the addition of saturated potassium chloride to the calomel cell vessel 24.

For purposes of illustration merely, and without limitation of my invention, the electrodes are shown as connected with suitable apparatus for measuring voltages or differences of potential which are representative of the selected ion concentration. In the example shown, such apparatus comprises a potentiometer P having a source of current or battery S delivering current through resistance R one terminal of which is connected to one of the electrodes, as the positive electrode. Movable along the resistance R is the contact c connected with galvanometer G, which is connected to the other, or negative, electrode. The contact c is moved along resistance R to such position that the galvanometer deflection is nil, in which case the fall of potential across that part of resistance R to the left of contact c is equal to the voltage developed by the selected ion-concentration cell. This potential may be read from the meter V whose scale may be calibrated in terms of ion concentration or from a calibrated scale associated with the resistance R. The potentiometer may be of the self-balancing type utilizing apparatus generally of the type disclosed in Leeds Patent 1,125,699 for recording and controlling.

What I claim is:

Apparatus for determining the concentration of a selected ion of a flowing electrolyte comprising an ion concentration cell traversed by the electrolyte, a reservoir closed to atmosphere and containing a solution of quinhydrone miscible with the electrolyte, an intermediate chamber in communication with said chamber and open to atmosphere, and a capillary tube for feeding quinhydrone solution to said electrolyte before passage to said cell having a hooded top, the bore of said capillary tube opening into said solution beneath the hood, extending upwardly into the hood, and thence downwardly toward said electrolyte.

CURTIS C. COONS.